United States Patent

Marshall

[15] 3,666,077
[45] May 30, 1972

[54] POWER DRIVEN CONVEYOR

[72] Inventor: Burton H. Marshall, Accord, N.Y. 12404

[22] Filed: Feb. 18, 1969

[21] Appl. No.: 800,051

Related U.S. Application Data

[63] Continuation-in-part of Ser. No. 727,745, May 8, 1968, Pat. No. 3,431,805, which is a continuation of Ser. No. 655,822, July 25, 1967, abandoned.

[52] U.S. Cl..............................198/29, 198/33 AB, 198/127
[51] Int. Cl.....................................B65g 47/22, B65g 13/02
[58] Field of Search..................198/29, 127, 33 AB; 193/43, 193/35, 32; 83/103

[56] References Cited

UNITED STATES PATENTS

| 2,030,816 | 2/1936  | Fenton  | 198/33 R |
| 2,659,477 | 11/1953 | Lawson  | 198/203  |
| 2,924,323 | 2/1960  | Holben  | 198/127  |
| 3,128,868 | 4/1964  | Bowen   | 198/32 R |
| 3,258,105 | 6/1966  | Willsey | 198/30   |
| 3,330,401 | 7/1967  | Ahlstedt| 193/32   |
| 3,463,297 | 8/1969  | Morgan  | 198/127  |
| 2,949,138 | 8/1960  | Card    | 198/127  |

Primary Examiner—Richard E. Aegerter
Attorney—Strauch, Nolan, Neale, Nies & Kurz

[57] ABSTRACT

A power driven conveyor having driven skewed rollers which cooperate with a longitudinally extending guide to position articles laterally of the conveyor. The conveyor may have retractible stops for halting articles on the conveyor and/or one or more guides for turning articles moving therealong.

12 Claims, 7 Drawing Figures

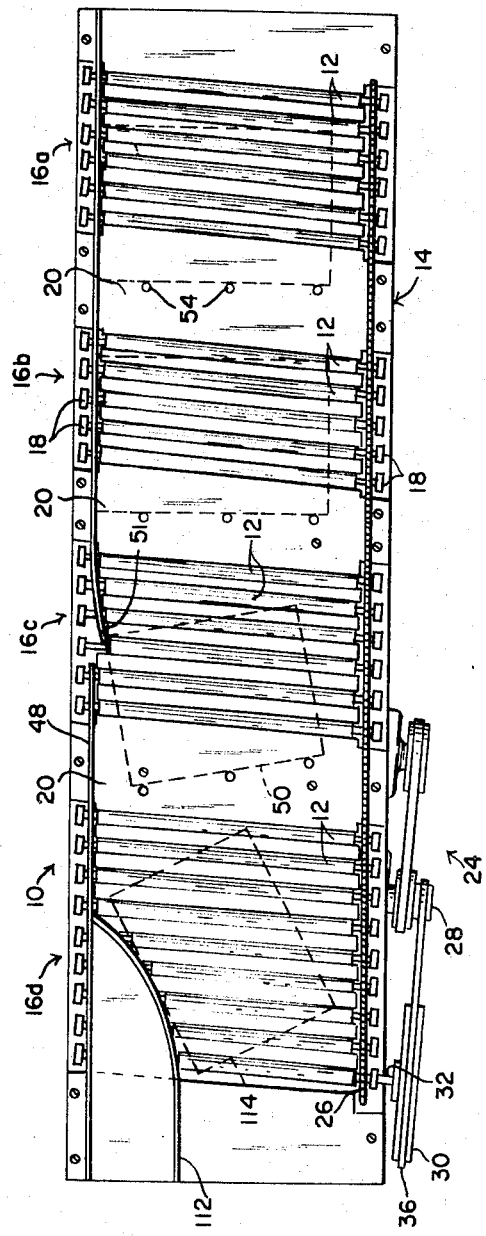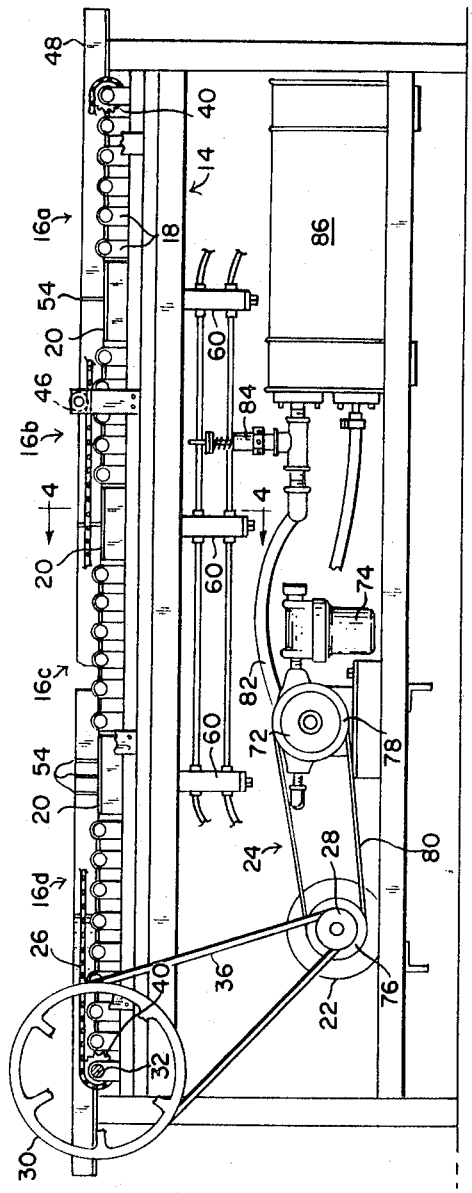
INVENTOR.
BURTON H. MARSHALL

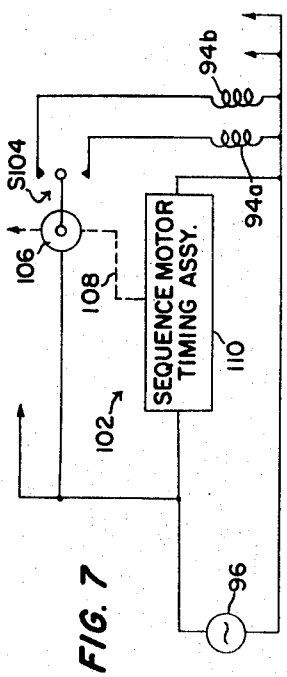
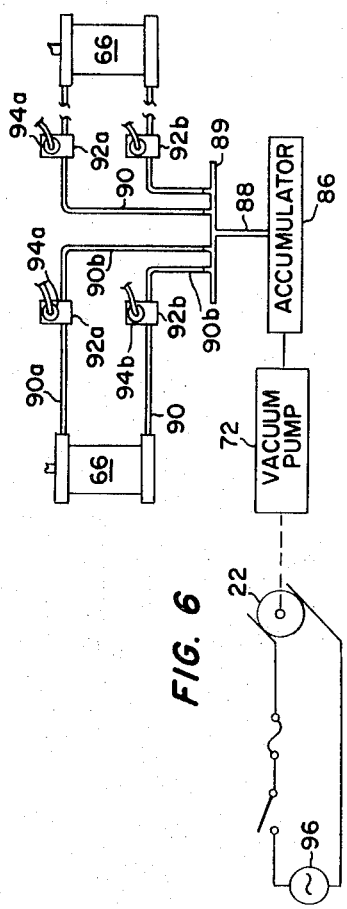
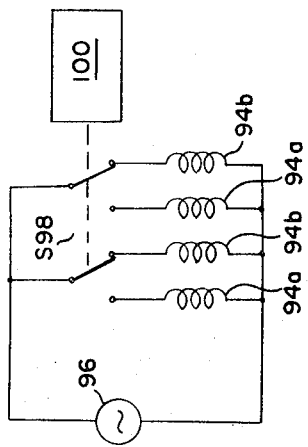
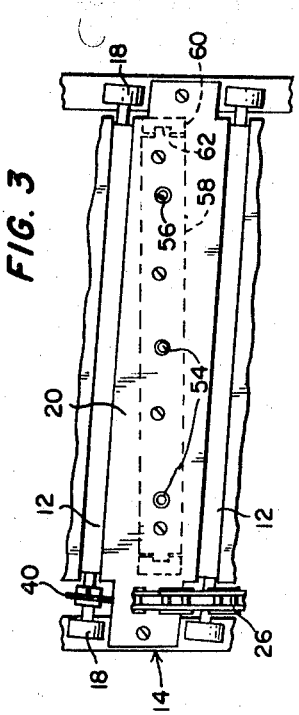
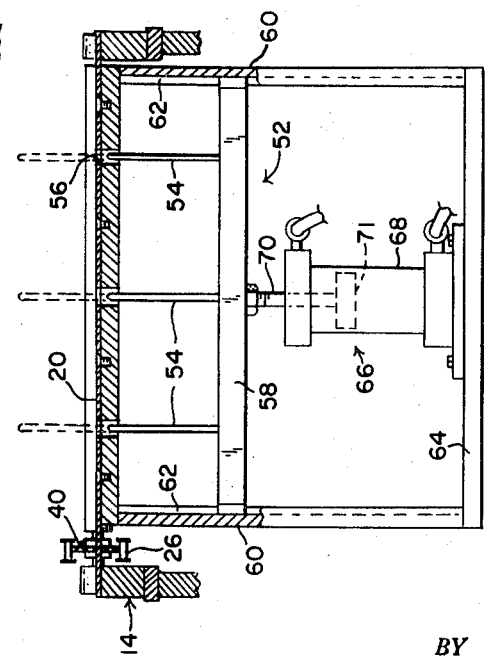
INVENTOR.
BURTON H. MARSHALL

POWER DRIVEN CONVEYOR

This application is a continuation-in-part of application Ser. No. 727,745, now U.S. Pat. No. 3,431,805 filed May 8, 1968. Application Ser. No. 727,745 is a continuation of application Ser. No. 655,822 filed July 25, 1967, now abandoned.

The present invention relates to conveyors and, more particularly, to conveyors of the power driven type.

It is the primary object of the present invention to provide novel, improved conveyors of the power driven type.

Other important but more specific objects of the present invention reside in the provision of conveyors in accord with the preceding object:

1. which have an arrangement for positioning packages laterally of the conveyor as they are moved therealong;
2. which, in accord with the preceding object, employ skewed driven rollers (i.e., rollers inclined at an acute angle relative to the longitudinal centerline of the conveyor) that cooperate with a longitudinally extending guide to effect lateral positioning of the articles carried therealong;
3. which are provided with a novel stop arrangement for halting articles carried by the conveyor at one or more predetermined positions therealong;
4. which are provided with a novel arrangement for turning articles carried therealong to thereby change the orientation of the articles.

Other important objects, features, and advantages of the present invention will become apparent from the appended claims and as the ensuing detailed description and discussion proceeds in conjunction with the accompanying drawing, in which:

FIG. 1 is a plan view of a conveyor constructed in accord with the principles of the present invention;

FIG. 2 is a side view of the conveyor of FIG. 1;

FIG. 3 is a partial plan view of the conveyor to an enlarged scale;

FIG. 4 is a section through the conveyor, taken substantially along 4—4 of FIG. 1;

FIG. 5 is a simplified schematic of an electrical control system for the conveyor;

FIG. 6 is a schematic of a hydraulic system for the conveyor; and

FIG. 7 is a schematic of an alternate form of control system.

Referring now to the drawing, FIG. 1 depicts an exemplary conveyor 10 constructed in accord with the principles of the present invention. Conveyor 10 includes a plurality of parallel, spaced apart rollers 12, which are rotatably supported from a frame work 14[1] ([1] Framework 14 may take various forms depending upon the application of the invention. For this reason and because its details are not part of the invention it will not be described to any great extent herein.) in four groups 16a–d[2] ([2] The number of roller groups may of course be increased or decreased as desired for different applications of the invention.) by bearing assemblies 18. Plates 20 supported from the framework bridge the gaps between adjacent groups of rollers. Rollers 12 may be driven by any desired drive arrangement. The one illustrated as an example of those which are appropriate includes a motor 22, which is drive-connected to the rollers by a belt drive 24 and a drive chain 26. The belt drive includes a pulley 28 fastened to the motor output shaft, a pulley 30 fixed to a shaft 32 extending from the last roller 12 at the discharge end of the conveyor, and a belt 36 trained around the pulleys.

Drive chain 26 is trained around sprockets 40 fixed to shaft 32 and to the roller 12 at the opposite, feed end of the conveyor. Chain 26 also engages sprockets 40 fixed to the remaining rollers 12 (see FIG. 4) so that all of the rollers are driven. Conventional idlers 46 (one of which is shown in FIG. 1) keep the upper run of the chain taut and in engagement with the sprockets it engages.

As shown in FIG. 2, rollers 12 are oriented in skew relationship to the longitudinal axis or centerline of the machine, i.e., with their axes of rotation at a small acute angle to a line to the longitudinal conveyor axis, and with the trailing edges of the rollers all at one side of the machine. This is an important feature of the invention as the skew arrangement of the rollers causes articles deposited on them at the feed end of the conveyor to drift or migrate to the side of the conveyor at which the roller trailing edges are located as they are transported toward the discharge end of the machine. As they approach this side of the conveyor (the upper side of FIG. 2), they engage a guide rail 48 extending longitudinally from the feed end of the conveyor to its discharge end at the side of the conveyor where the trailing edges of rollers 12 are located. Thus the skewed rollers and guide rail 48 cooperate to automatically position the conveyed articles laterally on the conveyor.

Guide rail 48 extends above rollers 12 as shown in FIG. 1 and is fastened to framework 14 in any desired fashion. The guide rail may be straight or, as shown in FIG. 2, may be configured to displace the conveyed articles laterally at specified locations. For example, reference character 50 in FIG. 2 identifies an article moved toward the center of conveyor 10 by a curved portion 51 of guide rail 48 as the article passes over roller group 16c. The arrangement just described is of considerable practical importance as it provides an easy method of laterally repositioning articles at locations where operations are to be performed on them, for example.

In such applications where operations are to be performed on the conveyed articles and in other applications where they can be employed to advantage, conveyor 10 may also be provided with one more stop assemblies 52 to halt articles at predetermined locations therealong.[3] ([3] The combination of properly configured guide rail and stop assembly can accordingly be employed to precisely locate conveyed articles both laterally and longitudinally of the conveyor.) As shown in FIG. 4, these stop assemblies typically include a set of stop members or pins 54 spaced transversely of the conveyor and extending vertically through apertures 56 in the plate 20 bridging the adjacent roller groups 16 between which the stop assembly is located. Stop pins 54 may be disposed in a straight line normal to the longitudinal centerline of conveyor 10 as shown in FIG. 2 or may be otherwise disposed across the conveyor as required to properly position the conveyed articles. (Also, the pins can be replaced by a continuous gate or stop extending across the conveyor or otherwise modified as desired).

The lower ends of stop pins 54 are fixed to a transversely extending support 58 mounted for vertical movement in parallel, spaced apart, vertical guides 60 provided with grooves or ways 62 into which the ends of support 58 extend. The lower ends of guides 60 are connected by a transversely extending cross member 64 into a unitary structure for rigidity.

Stop pins 54 of assembly 52 are elevated to halt articles on conveyor 10 and retracted to permit them to continue along the conveyor by a motor 66. As illustrated motor 66 is a double-acting vacuum motor. It may, however, if desired, be another type of fluid motor such as hydraulic or pneumatic or a completely different type of linear-acting motor or device such as a solenoid or the like, for example. The cylinder 68 of motor 66 is mounted on cross member 64 in the illustrated embodiment of the invention and its connecting rod 70 is attached to the vertically movable stop pin support 58. Accordingly, when the lower end of the vacuum motor is connected to a vacuum source, the piston 71 of the motor and connecting rod 70 move upwardly together with support 58 and pins 54 until the latter reach the operative position shown in dotted lines in FIG. 4. Conversely, when the upper end of the motor is connected to the vacuum source, connecting rod 70 and support 58 are retracted, lowering the pins to the inoperative position shown in full lines in FIG. 4.

Referring now to FIG. 6, the vacuum source just mentioned includes a vacuum pump 72 which is provided with a conventional muffler 74 and is driven by conveyor motor 22 through a drive train including pulleys 76 and 78 and belt 80. The vacuum pump is connected through flexible conduit 82 and pressure regulator 84 to a vacuum tank or accumulator 86.

Vacuum tank 86 is connectable to the vacuum motors 66 of stop assemblies 52 through main vacuum line 88, manifold 89, and branch vacuum lines 90 in which solenoid operated valves 92 are interposed, there being two valves 92a and 92b for controlling the operation of each motor 66. More specifically, the upper and lower ends of motors 66 are connected to atmosphere through branch vacuum lines 90a when the solenoids 94 of the valves are de-energized and to accumulator 86 through branch lines 90a and 90b, manifold 89, and main vacuum line 88 when solenoids 94 are energized. Thus, when the solenoid 94a of valve 92a is energized, and the solenoid 94b of valve 92b de-energized, one end of the associated motor 66 is connected to accumulator 86 and the opposite end to atmosphere, causing the piston and connecting rod to move in one direction. Reversal of the connections to energize solenoid 94b and de-energize solenoid 94a of course causes the piston and connecting rod to move in the opposite direction.

The cooperating solenoids 94a and 94b associated with each vacuum motor 66 can be energized in a variety of ways, depending upon the application of the invention. For example, as shown in FIG. 5, they can be simply connected to a source of operating voltage 96 through a double throw switch S98.[4] ([4] A three-position switch can be used instead, if desired, so that both solenoids 94a and 94b of each pair can be deenergized when the stop members 54 are in the "down" or retracted position shown in full lines in FIG. 4.) The operator 100 for switch S98 may be of the manual type, or it may be automatically responsive to any of a number of parameters such as article location or spacing, article weight or size, etc. Further, as shown in FIG. 5, the solenoid pairs 94a, 94b associated with two or more motors 66 can be so connected that part or all of the motors will be actuated simultaneously. While the illustrated connections provide simultaneous elevation or retraction of the stop assemblies, the connections can be readily altered so that one or more stop assemblies will be elevated at the same time that one or more other stop assemblies are retracted.

In another exemplary control system illustrated in FIG. 7, energization of solenoid pairs 94a, 94b is effected by timing mechanism 102 of conventional construction. This mechanism includes switches S104 adapted to be opened and closed by cams 106 (only one of which is shown) mounted on a timing or cam shaft 108 rotatable by a timer motor 110 connected across power source 96. The solenoids 94 of valves 92 are connected to the source of operating voltage 96 through the associated switches S104. Accordingly, as switches S104 are opened and closed by cams 106, the associated solenoids 94 are energized and de-energized to open and close the corresponding valves 92 and operate vacuum motors 66 to raise and retract stop assemblies 52 in the manner discussed previously. This type of control assembly can also be utilized to control plural motors 66 as suggested in FIG. 7.

To further increase the versatility of conveyor 10, it may also be equipped with a curved guide of the type identified by reference character 112 in FIG. 2. Guide 112 is mounted on framework 14 above rollers 12 in any convenient fashion with one end adjacent guide rail 48 and the opposite, free end spaced toward the centerline of the conveyor from the guide rail, giving guide 112 a generally wedgelike appearance. As is apparent from the interaction of guide 112 and article 114 depicted in FIG. 2, guide 112 will automatically turn or rotate articles engaged by it is they move along conveyor 10, changing their orientation relative to conveyor 10. This arrangement is accordingly of considerable practical value in applications where, as an example, it is necessary to turn an article between the performance of successive operations on it.

A number of modifications of the present invention have been described above. Others will readily occur to those skilled in the arts to which the present invention pertains. Accordingly, to the extent that such modifications are not expressly excluded from the present claims, they are fully intended to be covered therein.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A conveyor of the power driven type, comprising:
    a. a frame;
    b. a guide supported by said frame and extending longitudinally of said conveyor at one side thereof;
    c. means for moving articles along said conveyor and for maintaining said articles in engagement with said guide, whereby said articles are positioned laterally of the conveyor by co-operation of the article moving means and the guide; and
    d. means for halting articles on said conveyor at a plurality of locations therealong, each said means comprising stop means elevatable to a position above the means for moving articles and retractable to a position in which they do not interfere with the movement of articles along the conveyor and a fluid-operated motor for elevating and retracting each of said stop means, solenoid valve means for controlling the flow of operating fluid to and from said motors, and timing means including switch means connected in series with the valve solenoids for controlling the energization and de-energization of said solenoids and thereby controlling the sequence of elevation and retraction of the said stop means.

2. The conveyor of claim 1, wherein each said stop means comprises:
    a. a vertically displaceable support extending transversely of said conveyor;
    b. means for guiding the vertical displacement of said support; and
    c. a plurality of stop members fixed to and extending upwardly from said support, said stop members being located at intervals along said support, whereby they are spaced transversely of the conveyor.

3. The conveyor of claim 2, wherein said stop members are adapted to extend upwardly through a gap between adjacent ones of said rollers and including a plate spanning the gap between said rollers, said plate being apertured to accommodate the upward movement of said stop members as said support is elevated.

4. The conveyor of claim 2, wherein each said motor means comprises:
    a. a cylinder component and a connecting rod component extensible from and retractible into said cylinder component, one of said components being fixed to said frame and the other of said components being fixed to said stop member support; and
    b. means for effecting extension and retraction of the connecting rod component relative to said cylinder component to thereby raise and lower the stop member support.

5. The power driven conveyor of claim 1, wherein the means for moving articles along the conveyor and for maintaining articles in engagement with said guide comprises a series of transversely extending rollers rotatably supported from said frame in parallel spaced apart relationship and drive means for rotating said rollers, said rollers being oriented with their axes of rotation at an acute angle relative to the longitudinal axis of the conveyor, whereby articles carried along said conveyor by said rollers are moved toward the side of the conveyor at which the trailing edges of said rollers are located.

6. The power driven conveyor of claim 5, wherein said rollers are disposed in a plurality of groups and wherein there is a stop means as aforesaid located between each of said groups, whereby articles may be halted at a plurality of locations along said conveyor.

7. The conveyor of claim 6, together with means for simultaneously actuating the motor means associated with a plurality of said stop means, whereby a plurality of articles may be simultaneously halted on said conveyor.

8. The power driven conveyor of claim 5, wherein the fluid-operated motor is a vacuum motor and including a vacuum pump for controlling the operation of the vacuum motor and a single motor drive-connected to said drive means and to said vacuum pump for rotating said rollers and for operating the pump.

9. The conveyor of claim 8, wherein said motor and said vacuum pump are supported on said frame and including a vacuum tank mounted on the frame and means providing fluid communication between said vacuum pump and said vacuum tank and between said vacuum tank and said vacuum motor.

10. The power driven conveyor of claim 5, wherein the drive means for rotating the rollers comprises a motive power source, a first means drive-connecting said motive power source to the first in said series of rollers, and a second means drive-connecting the first in said series of rollers to the remaining rollers in said series.

11. The power driven conveyor of claim 5, together with a second guide for turning articles carried along said rollers and engaged by said first guide relative to said rollers to thereby change the orientation of the articles relative to the rollers, said second guide overlying a plurality of said rollers at the trailing edges thereof, whereby said rollers keep the articles being turned in contact with said second guide as they are turned.

12. The conveyor of claim 11, wherein said second guide has a curved configuration and wherein one end is juxtaposed to said first guide and the other end of said second guide is displaced laterally relative to said first guide.

* * * * *